United States Patent
Rossetti

(10) Patent No.: US 9,777,711 B2
(45) Date of Patent: Oct. 3, 2017

(54) METHOD FOR REDUCING OSCILLATIONS IN OFFSHORE WIND TURBINES

(75) Inventor: Michele Rossetti, Les Botihuer De Sitges (ES)

(73) Assignee: ALSTOM Renewable Technologies, Grenoble (FR)

( * ) Notice: Subject to any disclaimer, the term of this patent is extended or adjusted under 35 U.S.C. 154(b) by 1144 days.

(21) Appl. No.: 13/885,386

(22) PCT Filed: Nov. 24, 2011

(86) PCT No.: PCT/EP2011/070915
§ 371 (c)(1),
(2), (4) Date: May 14, 2013

(87) PCT Pub. No.: WO2012/069578
PCT Pub. Date: May 31, 2012

(65) Prior Publication Data
US 2013/0236309 A1    Sep. 12, 2013

(30) Foreign Application Priority Data

Nov. 25, 2010 (EP) .................... 10382317

(51) Int. Cl.
F03D 7/04 (2006.01)
B63B 21/50 (2006.01)
B63B 39/08 (2006.01)
B63H 25/42 (2006.01)
(Continued)

(52) U.S. Cl.
CPC .............. F03D 7/042 (2013.01); B63B 21/50 (2013.01); B63B 39/08 (2013.01); B63H 25/42 (2013.01);
(Continued)

(58) Field of Classification Search
CPC ........ F03D 7/0296; F03D 7/042; F03D 13/25; F03D 80/00; F05B 2240/93;
(Continued)

(56) References Cited

U.S. PATENT DOCUMENTS 3,318,275 A    5/1967  Field
8,197,208 B2 *  6/2012  Sharples ............... F03D 1/0608
                                            415/7

(Continued)

FOREIGN PATENT DOCUMENTS

DE          10 219062      11/2003
DE       10 2005 040803     3/2007
(Continued)

OTHER PUBLICATIONS

International Search Report and Written Opinion for PCT/EP2011/070915, mailed Jan. 31, 2012, 12 pgs.

*Primary Examiner* — Igor Kershteyn
(74) *Attorney, Agent, or Firm* — Dority & Manning, P.A.

(57) ABSTRACT

The invention relates to a method of reducing oscillations in an offshore wind turbine comprising one or more thrusters, the method comprising determining an oscillation of the offshore wind turbine and operating the one or more thrusters such that the oscillation is reduced. The invention further relates to an offshore wind turbine comprising one or more underwater thrusters, oscillation determination system for determining an oscillation of the wind turbine and a control system for operating the underwater thrusters in response to signals received from the oscillation determination system.

16 Claims, 5 Drawing Sheets

(51) Int. Cl.
*F03D 7/02* (2006.01)
*F03D 80/00* (2016.01)
*F03D 13/25* (2016.01)
*B63B 22/04* (2006.01)
*B63B 35/44* (2006.01)

(52) U.S. Cl.
CPC ........... *F03D 7/0296* (2013.01); *F03D 13/25* (2016.05); *F03D 80/00* (2016.05); *B63B 22/04* (2013.01); *B63B 2035/446* (2013.01); *F05B 2240/93* (2013.01); *F05B 2240/95* (2013.01); *F05B 2260/74* (2013.01); *F05B 2260/96* (2013.01); *F05B 2270/807* (2013.01); *Y02E 10/723* (2013.01); *Y02E 10/727* (2013.01)

(58) Field of Classification Search
CPC .............. F05B 2240/95; F05B 2260/74; F05B 2260/96; F05B 2270/807; B63B 21/50; B63B 39/08; B63B 22/04; B63B 2035/446; B63H 25/42; Y02E 10/723; Y02E 10/727
See application file for complete search history.

(56) References Cited

U.S. PATENT DOCUMENTS

| | | | | |
|---|---|---|---|---|
| 8,322,107 | B2* | 12/2012 | Murata | ................... F03D 13/20 138/120 |
| 8,613,569 | B2* | 12/2013 | Belinsky | ................. E02D 27/42 405/203 |
| 2007/0114799 | A1 | 5/2007 | Riesberg et al. | |
| 2012/0098265 | A1 | 4/2012 | Skaare | |

FOREIGN PATENT DOCUMENTS

| | | |
|---|---|---|
| DE | 10 2007 029921 | 11/2008 |
| DE | 10 2008 029982 | 12/2009 |
| EP | 1348867 | 10/2003 |
| JP | 2009-068383 | 4/2009 |
| WO | WO 2005021961 | 3/2005 |
| WO | WO 2009/000249 | 12/2008 |
| WO | WO 2009/087200 | 7/2009 |
| WO | WO 2010/048560 | 4/2010 |

* cited by examiner

METHOD FOR REDUCING OSCILLATIONS IN OFFSHORE WIND TURBINES

The present invention relates to offshore wind turbines, and more particularly relates to a method for reducing oscillations in offshore wind turbines and to offshore wind turbines adapted for this purpose.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Wind turbines are often grouped together in so-called wind farms. It has become increasingly difficult to find suitable locations for wind farms on land. On many occasions, there has been a lot of opposition against placement of wind turbines due mainly to the noise produced by the wind turbines and aesthetic effects of the placement of wind turbines. Additionally, for wind turbines to be able work efficiently, a windy and open area free from trees and buildings etc. is needed which is not always readily available.

For many reasons, it has become more popular to place wind turbines or wind parks in sea, either close to the coast (near-shore) or offshore (sometimes referred to as "far-offshore"): larger areas are available offshore, the wind may be more constant and of higher velocity on sea than on land, and wind shear is generally reduced. Additionally, with reduced noise constraints, wind turbines can rotate at higher speeds.

In near-shore applications, the wind turbines may be fixedly placed in generally shallow water (depths of approximately 25 meters or less) on foundations in the sea bottom. In far-offshore applications, the wind turbines may be designed to be floating platforms. Various configurations for floating wind turbines are known. They may e.g. be divided along the way in which they try to achieve static stability: using ballast weight, mooring lines or buoyancy.

The platforms that try to achieve static stability using ballast generally comprise an elongated tower structure comprising ballast weight under the water line and a buoyancy tank more or less at the water line. An example is shown in FIG. 1. Examples of platforms that try to achieve static stability using the tension of the mooring lines are shown e.g. in WO2009/087200 and EP1348867. Platforms that aim to achieve stability through the use of distributed buoyancy comprise a plurality of buoyancy tanks distributed around the tower at the water line. DE10219062 shows an example of a platform of this type. All floating platforms are provided with some form of mooring and anchoring means. Hybrid forms of the described floating wind turbine configurations may also be used.

Floating platforms can perform movements and rotations along three axes. With reference to FIG. 2, the x, y and z-axis of a local coordinate system can be defined. The x-axis is generally determined by the wind direction. The z-axis is determined by the longitudinal axis of the wind turbine. The y-axis is perpendicular to both the x and z-axes.

A linear motion along the x-axis is generally called "surge", a linear motion along the y-axis is generally called "sway", and a linear motion along the z-axis is generally called "heave". Rotational motion around the x-axis are generally referred to a "roll", rotational motion around the y-axis are generally referred to as "pitch" (not to be confused with pitching of a blade, which is a rotation of a wind turbine blade around is longitudinal axis), and rotational motion around the z-axis are generally referred to as "yaw".

Floating platforms may perform complicated motion patterns under influence of e.g. wind gusts, turbulent wind, wind shear, asymmetry due to icing on the blades, waves, and tidal streams. An additional source of loads that may induce motions or oscillations in a floating wind turbine platform is the pitch control of the wind turbine blades. A common control strategy of a pitch system in a variable speed wind turbine is to maintain the blade in a predefined "below rated pitch position" at wind speeds equal to or below nominal wind speed. Said default pitch position may generally be close to a 0° pitch angle. Above the nominal speed, the blades are rotated to maintain the aerodynamic torque delivered by the rotor substantially constant. The exact cut-in wind speed, nominal wind speed and cut-out wind speed may depend on the location of the turbine, the turbine design etc.

FIG. 3 illustrates the variable speed strategy. Until nominal speed, the pitch angle is not varied and equal to or close to zero. Above nominal speed, the pitch angle is varied to maintain the aerodynamic torque constant. At the same time, due to the change in pitch angle (and angle of attack) of the blades, the thrust on the wind turbine (in x-direction, as defined in FIG. 2) is reduced above the nominal wind speed.

When the wind speed varies above the nominal wind speed, the pitch angle constantly needs to be adjusted. This adjustment leads to an ever changing thrust on the wind turbine. An oscillating thrust may cause fore-aft oscillations of the wind turbine. These oscillations may either be surging oscillations (displacement in x-direction) or a pitching motion (rotation around the y-axis). Similar effects also take place in wind turbines on land or near-shore wind turbines fixed on a foundation in the sea. The variation of the pitch angle and the variation of thrust that comes with it may lead to fore-aft oscillations in onshore wind turbines as well.

Under certain circumstances, resonance of the wind turbine in such a fore-aft oscillation may become a problem. The kind of fore-aft oscillations that can occur and the problems they can cause depend e.g. on the configuration of the turbine platform, the tension of the mooring lines, the configuration of buoyancy tanks etc.

One known measure to reduce fore-aft oscillation in wind turbines is to vary the pitch control such that resonance can be avoided. A disadvantage of this method is that the maximum potential power output of the wind turbine is not achieved, because the ideal pitch angles are not employed. Secondly, even though such an alternative pitch control has in some cases successfully been applied in wind turbines placed on land, they may not always be successful in offshore applications. This is due to the fact that the oscillations may generally be of lower frequency for which there is a particular danger of resonance.

There thus still exists a need to provide an effective method for reducing fore-aft oscillations in offshore wind turbines and an offshore wind turbine adapted for this purpose.

Apart from the fore-aft oscillations previously described, under the influence of atmospheric conditions and waves, sideways oscillations (e.g. a swaying oscillation or a rolling oscillation) or yawing oscillations may also occur in offshore wind turbines. There also exists a need for a method for reducing these kinds of oscillations in offshore wind turbine and an offshore wind turbine adapted for this purpose.

It is an object of the present invention to at least partially fulfil the before-mentioned needs.

SUMMARY OF THE INVENTION

In a first aspect, the invention provides a method of reducing oscillations of an offshore wind turbine comprising one or more underwater thrusters, the method comprising measuring an oscillation of the offshore wind turbine and operating the one or more thrusters such that the oscillation is reduced.

In accordance with this aspect, underwater thrusters (such as e.g. propellers) are provided on the wind turbine and they can be operated to counteract oscillations of the wind turbine. By using underwater thrusters, the pitch control of the wind turbine blades does not need to be affected and the power output does not need to be significantly compromised. Additionally, the underwater thrusters can make sure that dangerous resonance situations can be avoided.

In some embodiments, measuring an oscillation comprises measuring the speed of an oscillation. In other embodiments, the speed of an oscillation may be determined from e.g. a measured position. The instantaneous position or inclination of a wind turbine may not always be the most relevant factor for the control of the underwater thrusters. The instantaneous speed may in circumstances be more suitable for the determination of the oscillation and the required response thereto using underwater thrusters.

In some embodiments, the oscillation to be dampened or reduced may be substantially a fore-aft oscillation (pitching oscillation or a surging oscillation). In other embodiments, the oscillation to be dampened or reduced may be substantially a sideways oscillation (rolling oscillation or a swaying oscillation). In further embodiments, the oscillation to be dampened or reduced may be substantially a yawing oscillation. In yet further embodiments, an oscillation to be dampened or reduced may be a combination of any of these.

In this sense, it is to be understood that oscillations may not always be purely pitching, purely surging, purely rolling or purely swaying or purely yawing. In reality an oscillation may e.g. comprise a major component that is a pitching oscillation and a minor component that is a surging oscillation. In such a case, such an oscillation is considered as substantially a pitching oscillation (or substantially a fore-aft oscillation).

In another aspect, the invention provides an offshore wind turbine comprising one or more underwater thrusters, an oscillation measurement system for measuring an oscillation of the wind turbine and a control system for operating the underwater thrusters in response to signals received from the oscillation measurement system.

In some embodiments, the oscillation measurement system comprises at least one accelerometer. Such an accelerometer may be a tri-axial accelerometer and could be positioned in the nacelle, on the tower, or on the floating platform.

In alternative embodiments, the oscillation measurement system comprises at least one receiver of a Global Navigation Satellite System (GNSS). An example of such a system is GPS, another example is e.g. GLONASS or Galileo. But also non-global positioning system could potentially be used. Also augmented GNSS systems may be used.

A GPS receiver (or similar) can determine its position. From the varying position of a wind turbine, its motion can be determined and thereby any oscillation to which it may be subjected.

In some embodiments, the offshore wind turbine may comprise one or more underwater thrusters that are adapted to assume different orientations with respect to the wind turbine tower. These kinds of thrusters can be adapted to provide thrust in different directions by changing their orientation. In alternative embodiments, a plurality of underwater thrusters which have a fixed orientation with respect to the wind turbine tower may be used.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
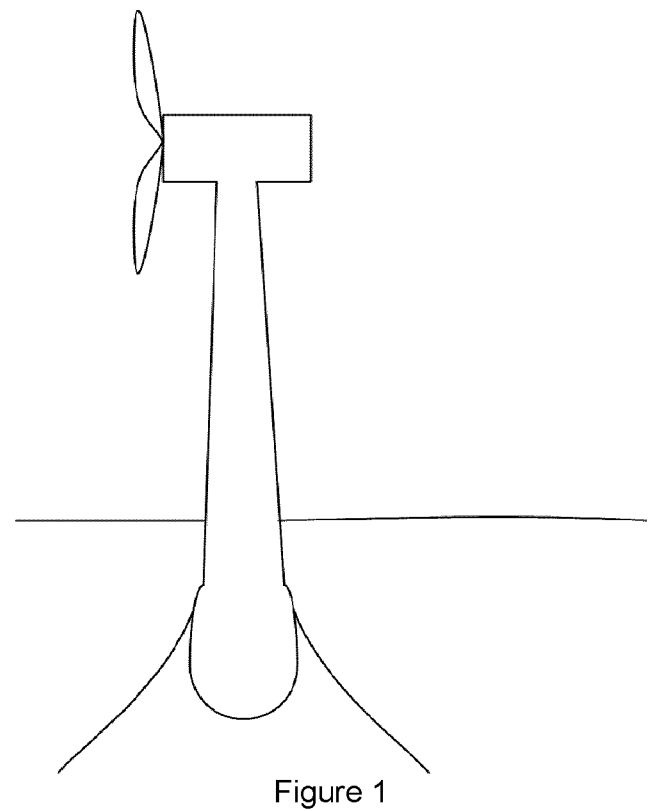
FIG. 1 illustrates an example of a prior art floating offshore wind turbine.
Figure 2:
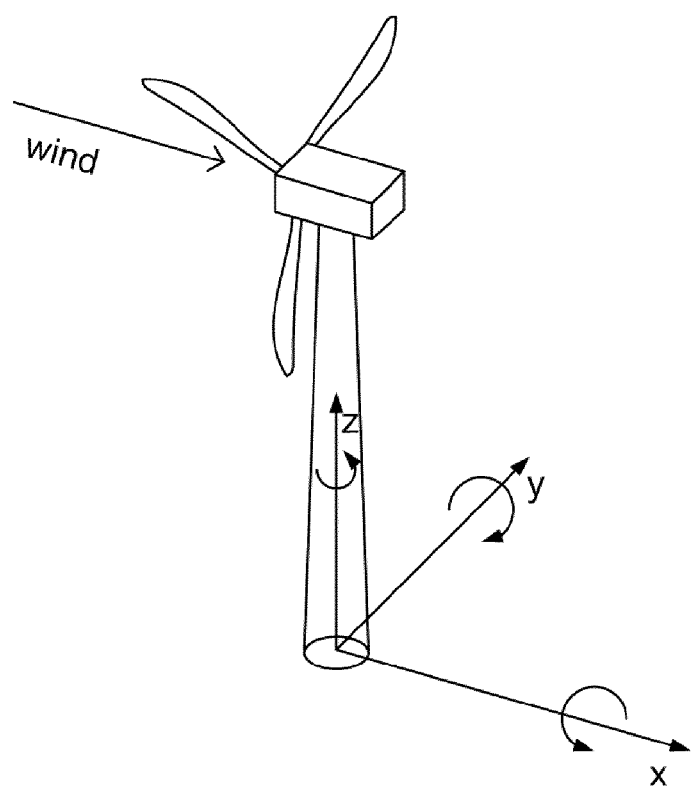
FIG. 2 illustrates a coordinate system for describing the movement of offshore wind turbines.
Figure 3:
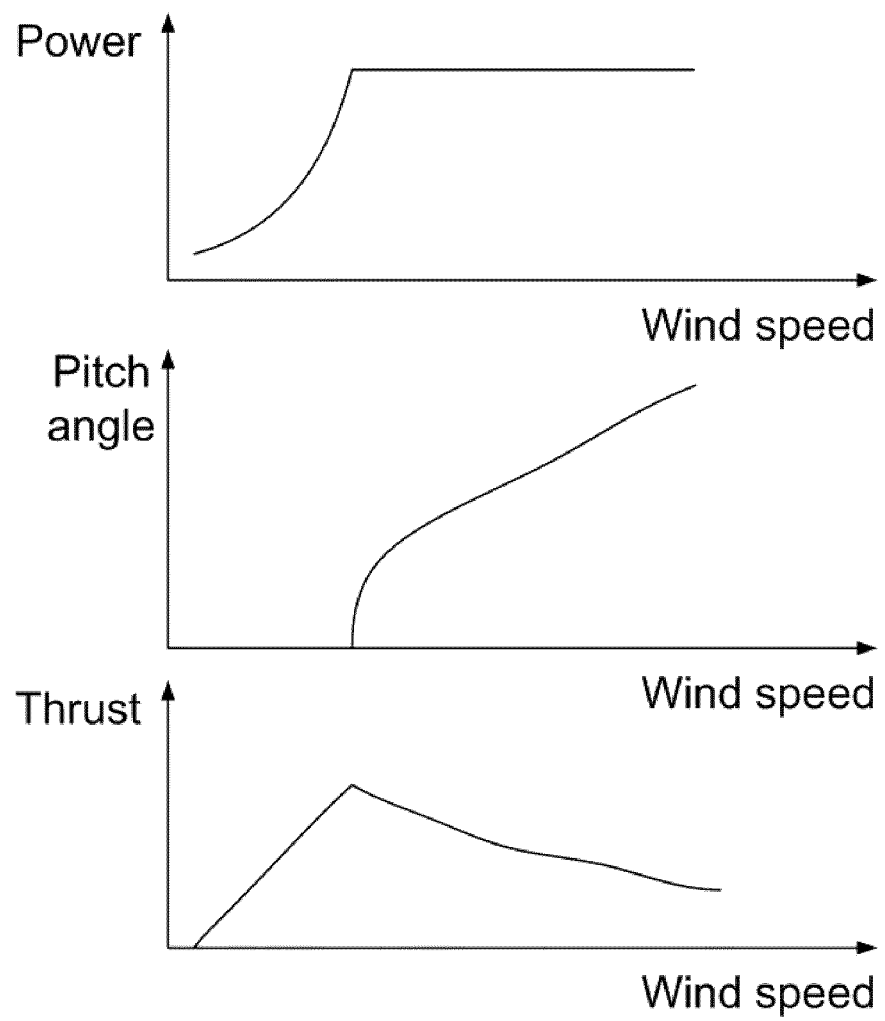
FIG. 3 illustrates a common pitch strategy in variable speed wind turbines and its effects on the thrust.
Figure 4A:
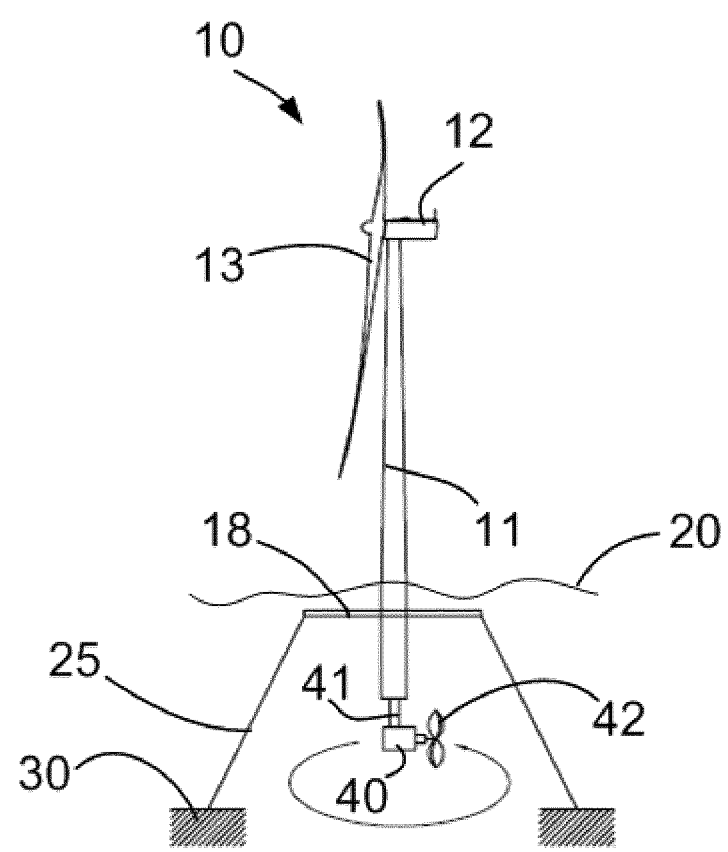
FIGS. 4a-4c schematically illustrate various embodiments of offshore wind turbines according to the present invention.

FIG. 4a schematically illustrates a first embodiment of an offshore wind turbine according to the present invention. The floating wind turbine 10 comprises a wind turbine tower 11, a nacelle 12 arranged on top of said tower and a rotor having a plurality of blades. The water level has been schematically indicated with reference sign 20.

The wind turbine tower 11 may comprise a buoyancy body and a ballast weight. Mooring lines 25 connected at the sea bed 30 serve to substantially keep the wind turbine in place and at least partially stabilize the floating wind turbine. The mooring lines 25 may be connected at stabilization arms 18. Although not clearly distinguishable in the side view provided in FIG. 4a, the stabilization arms 18 and mooring lines are not necessarily provided in the fore-aft direction or only in the fore-aft direction. In embodiments, the stabilization arms may e.g. extend in a radial direction away from the turbine tower. In other embodiments, the stabilization arms may form a circle, square or rectangle or yet other shape around the wind turbine tower.

As explained previously, due to changing loads (which may be caused particularly by pitching of the blades above nominal wind speed, but also by waves and wind gusts), the floating wind turbine may start oscillating e.g. pitching.

An underwater propeller 40 is provided at the bottom of the wind turbine tower. In this embodiment, the underwater propeller 40 is mounted on a shaft 41 which forms an extension of the wind turbine tower. Shaft 41 may be rotated and the propeller may thus change its orientation relative to the tower 11.

If it is measured that the wind turbine is oscillating in an undesirable way, the underwater propeller can be actuated to cause a thrust that attenuates the oscillation. By changing the orientation of the propeller, a forward or rearward thrust, but also a sideways thrust can be provided if needed. Depending on the kind of propeller, the speed of the propeller and/or angle of propeller blades 42 and thereby the amount of thrust may also be adjusted in accordance with circumstances.

In an example, in a fore-aft oscillation, the propeller may be kept substantially in the same orientation and may be operated in a pulsed manner. In another example, the propeller's orientation may continuously or very frequently be changed.

In some embodiments, a propeller may be provided in which the sense of rotation of the propeller blades may be adjustable. In these embodiments, if the propeller blades rotate in a first direction a rearward thrust with respect to the propeller may be established. And if the blades rotate in a second direction, a forward thrust with respect to the propeller may be established. In these embodiments, the propeller's orientation does not need to be changed in order to be able to change the direction of thrust that can be provided.

A system has thus been provided that is adapted to damp oscillations in different directions. To measure an oscillation a receiver of a Global Navigation Satellite System (GNSS), such as a GPS receiver may be provided in the wind turbine. Such a receiver may e.g. be mounted in the nacelle or in the tower. By determining a changing position of such a receiver, an oscillation may be measured. Accordingly, the propeller 40 may be actuated to dampen such an oscillation. The instantaneous position of the receiver (and thus the instantaneous position/orientation of the wind turbine) may be taken into account.

In embodiments of the invention, the changing position of a receiver may be used to determine an oscillation speed and the propeller may be actuated taking the speed of oscillation into account.

In some embodiments of the invention, an augmented GNSS system may be used. In these embodiments, the position of a wind turbine may be determined with respect to a reference point of which the exact location is known. Such a reference point may be located in the wind farm itself or elsewhere.

In alternative embodiments, one or more tri-axial accelerometers may be mounted on the wind turbine. The accelerations that are measured may be used to determine the presence of an oscillation and the oscillation speed. In response to these measurements, the propeller 40 may be actuated.

It should be noted that the pitch control of the blades does not necessarily need to be affected in order to dampen the oscillations. The electrical power output of the wind turbine therefore does not need to be negatively affected.

Figure 4B:
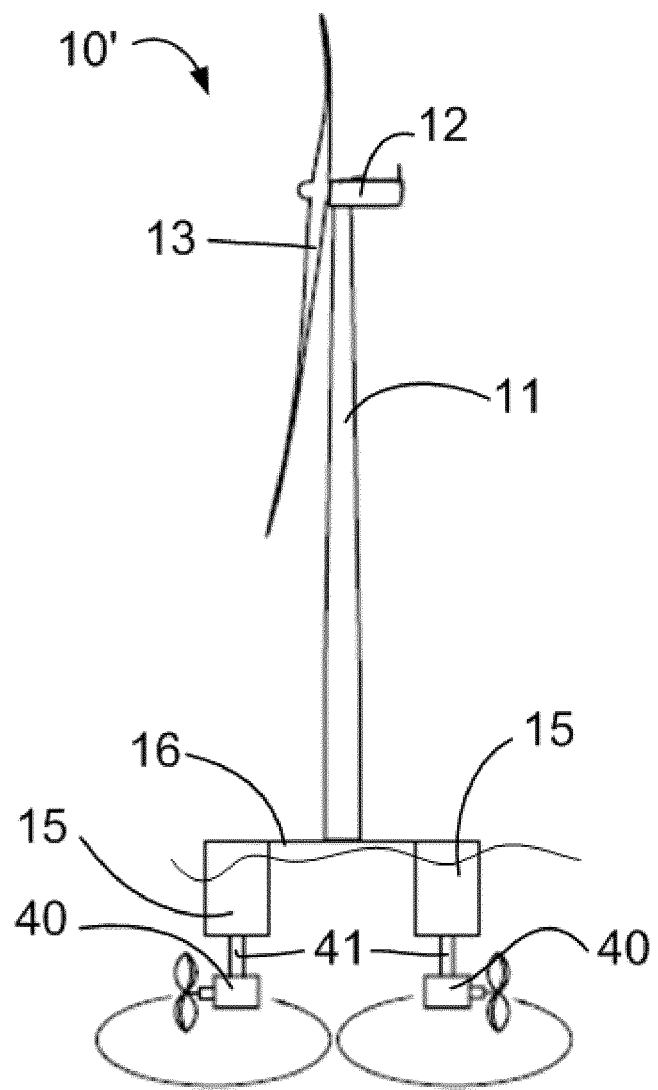

FIG. 4b shows a second embodiment of a floating wind turbine 10' in accordance with the present invention. The same reference signs have been used to indicate the same parts or components. In this example, the wind turbine 10' comprises a platform 16 upon which the wind turbine tower 11 is located. The platform 16 is carried by a plurality of buoyancy tanks 15. In the side view of FIG. 4b, only two buoyancy tanks are shown. In embodiments of the invention, a wind turbine may comprise two, three, four or more of these buoyancy tanks surrounding the platform 16.

Two underwater propellers 40 are mounted on the bottom of the buoyancy tanks 15. Both propellers are adapted to be able to change their orientation, since they are mounted on rotatable shafts 41. The working principle is similar to what was shown before: in response to an oscillation, the propellers may be actuated. Their orientation and/or thrust may be adapted. And they may or may not be actuated at the same time.

In embodiments comprising several buoyancy tanks, one or more of the buoyancy tanks may comprise such thrusters. By proper actuation of the thrusters, various kinds of oscillating motions including surging, pitching, swaying and rolling may be effectively dampened.

Also in these kinds of floating wind turbines, fixed propellers and/or propellers in which the sense of rotation may be changed can be used.

Figure 4C:
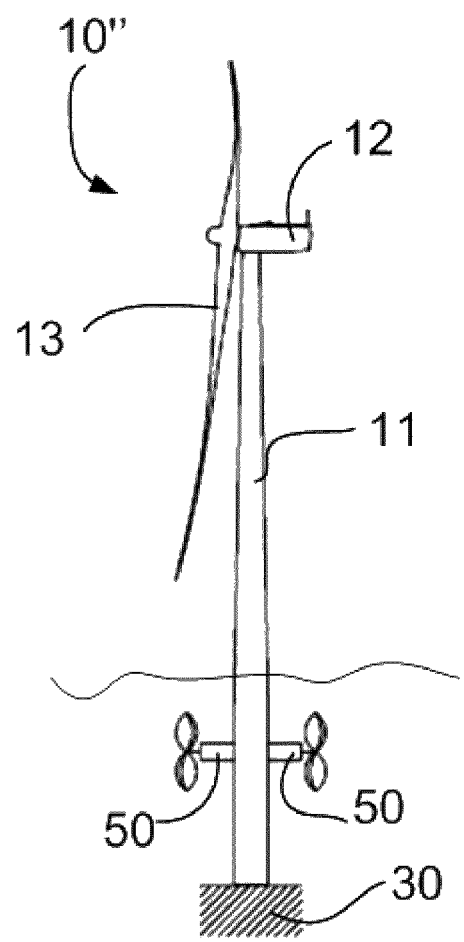

In FIG. 4c, yet a further embodiment of the present invention is illustrated. An offshore wind turbine 10" is provided that comprises a wind turbine tower that is fixed on a foundation in the sea bed 30. It is clear that this kind of offshore wind turbine is not subject to all the same movements that floating wind turbines are subjected to. However, in circumstances, also the fixed wind turbine may start oscillating e.g. in a fore-aft direction in response to a varying pitch angle.

In this embodiment two fixed underwater propellers 50 have been provided. In response to a measured oscillation, the underwater propellers can be actuated. The orientation of the two fixed propellers is especially suited for damping of fore-aft oscillations. The registration of an oscillation may substantially be the same as hereinbefore described.

In other embodiments, a single fixed propeller 50 may be provided. Such a single fixed propeller may in circumstances be enough to dampen oscillations using a pulsed actuation. In further embodiments, a single fixed propeller in which the sense of rotation (and thus the direction of thrust) can be changed may be employed. In yet further embodiments, the use of e.g. three fixed propellers could be envisaged to be able to dampen oscillations in various directions. It is further possible that not all the propellers are arranged at the same height of the tower.

In all embodiments, alternative thrusters may be provided instead of propellers, such as for example water jets.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating an offshore wind turbine and reducing oscillations, the wind turbine comprising a plurality of blades, a pitch system for rotating the blades and one or more underwater thrusters, the method comprising:
    above a nominal wind speed, rotating the blades to maintain a substantially constant aerodynamic torque delivered by the rotor and measuring an oscillation of the offshore wind turbine, and
    operating the one or more thrusters such that the oscillation is reduced,
    wherein a pitch control rotating the blades to maintain the substantially constant aerodynamic torque is not affected in order to dampen the oscillations.

2. The method according to claim 1, further comprising determining the speed of the oscillation.

3. The method according to claim 1, wherein the oscillation is substantially a fore-aft oscillation.

4. The method according to claim 3, wherein the oscillation is substantially a pitching oscillation.

5. The method according to claim 3, wherein the oscillation is substantially a surging oscillation.

6. The method according to claim 1, wherein the oscillation is substantially a sideways oscillation.

7. The method according to claim 1, wherein the oscillation is substantially a yawing oscillation.

8. The method according to claim 1, wherein the offshore wind turbine is a floating wind turbine.

9. An offshore wind turbine comprising:
a plurality of blades,
a pitch system for rotating the blades,
one or more underwater thrusters,
an oscillation measurement system for measuring an oscillation of the wind turbine,
a thruster control system for operating the underwater thrusters in response to signals received from the oscillation measurement system, and
a pitch control system adapted to rotate the blades to maintain a substantially constant aerodynamic torque delivered by the rotor above a nominal wind speed, wherein the pitch control system operates independently of the operation of the one or more thrusters.

10. The offshore wind turbine according to claim 9, wherein the wind turbine is a floating offshore wind turbine.

11. The offshore wind turbine according to claim 9, wherein the wind turbine is a fixed offshore wind turbine.

12. The offshore wind turbine according to claim 9, wherein the oscillation measurement system comprises at least one accelerometer.

13. The offshore wind turbine according to claim 9, wherein the oscillation measurement system comprises at least one GNSS receiver.

14. The offshore wind turbine according to claim 9, wherein the thruster control system is adapted to determine the speed of an oscillation from the measurements of the oscillation measurement system.

15. The offshore wind turbine according to claim 9, wherein one or more of the underwater thrusters are adapted to assume different orientations with respect to a wind turbine tower of the offshore wind turbine.

16. The offshore wind turbine according to claim 9, comprising a plurality of underwater thrusters that have a fixed orientation with respect to a wind turbine tower of the offshore wind turbine.

* * * * *